US012763052B2

(12) United States Patent
Cai et al.

(10) Patent No.: US 12,763,052 B2
(45) Date of Patent: Oct. 13, 2026

(54) RHYTHM INTERACTION METHOD AND DEVICE

(71) Applicant: Beijing Bytedance Network Technology Co., Ltd., Beijing (CN)

(72) Inventors: Xiaochun Cai, Beijing (CN); Jiajie Ye, Beijing (CN); Cong Ye, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 249 days.

(21) Appl. No.: 18/557,908

(22) PCT Filed: Apr. 26, 2022

(86) PCT No.: PCT/CN2022/089189
§ 371 (c)(1),
(2) Date: Oct. 27, 2023

(87) PCT Pub. No.: WO2022/228415
PCT Pub. Date: Nov. 3, 2022

(65) Prior Publication Data
US 2024/0233698 A1 Jul. 11, 2024

(30) Foreign Application Priority Data
Apr. 27, 2021 (CN) ......................... 202110460390.0

(51) Int. Cl.
*G10H 1/40* (2006.01)
*G10H 1/00* (2006.01)
(Continued)

(52) U.S. Cl.
CPC ............. *G10H 1/40* (2013.01); *G10H 1/0008* (2013.01); *H04N 21/2187* (2013.01);
(Continued)

(58) Field of Classification Search
CPC .. G10H 1/40; G10H 1/0008; G10H 2210/071; G10H 2220/081;
(Continued)

(56) References Cited

U.S. PATENT DOCUMENTS

2011/0009191 A1* 1/2011 Naidenov ............... A63F 13/35 463/43
2014/0155157 A1* 6/2014 Hazama .................. A63F 13/00 463/31
2020/0234684 A1 7/2020 Zhang et al.

FOREIGN PATENT DOCUMENTS

CN 107277636 A * 10/2017 ......... H04N 21/4788
CN 109286852 A * 1/2019 ........... H04N 21/235
(Continued)

OTHER PUBLICATIONS

ISA China National Intellectual Property Administration, International Search Report and Written Opinion Issued in Application No. PCT/CN2022/089189, Jul. 15, 2022, WIPO, 11 pages.
China National Intellectual Property Administration, Office Action and Search Report Issued in Application No. 202110460390.0, Jun. 7, 2023, 10 pages (submitted with partial English translation).

*Primary Examiner* — Duc Nguyen
*Assistant Examiner* — Chimezie Ezeriwe Bekee
(74) *Attorney, Agent, or Firm* — Alleman Hall LLP

(57) ABSTRACT

The present application provides a rhythm interaction method and device. The method includes: the first client sending a song identification to a server, the first client playing a song according to the audio data sent by the server, and the first client displaying the rhythm interaction result sent by the server within a preset time period before an end of the playing of the song.

16 Claims, 11 Drawing Sheets

(51) Int. Cl.
*H04N 21/2187* (2011.01)
*H04N 21/472* (2011.01)

(52) U.S. Cl.
CPC ..... *H04N 21/472* (2013.01); *G10H 2210/071* (2013.01); *G10H 2220/081* (2013.01); *G10H 2220/161* (2013.01)

(58) Field of Classification Search
CPC ......... G10H 2220/161; H04N 21/2187; H04N 21/472; H04N 21/4788; H04N 21/4314; H04N 21/4781; H04M 1/72442; H04L 65/611; A63F 13/814; A63F 13/44; A63F 13/577; A63F 13/2145
USPC ...................................... 700/94; 84/611, 635
See application file for complete search history.

(56) References Cited

FOREIGN PATENT DOCUMENTS

| | | | | | |
|---|---|---|---|---|---|
| CN | 109741722 | A | | 5/2019 | |
| CN | 110139116 | A | * | 8/2019 | ......... H04N 21/4312 |
| CN | 110244998 | A | | 9/2019 | |
| CN | 110267067 | A | | 9/2019 | |
| CN | 110267081 | A | | 9/2019 | |
| CN | 111935555 | A | | 11/2020 | |
| JP | 2020043454 | A | | 3/2020 | |
| WO | 2015114216 | A2 | | 8/2015 | |
| WO | 2021052133 | A1 | | 3/2021 | |

* cited by examiner

RHYTHM INTERACTION METHOD AND DEVICE

CROSS-REFERENCE TO RELATED APPLICATIONS

The present application is a National Stage of International Application No. PCT/CN2022/089189, filed on Apr. 26, 2022, which claims priority to Chinese Patent Application No. 202110460390.0, titled "RHYTHM INTERACTION METHOD AND DEVICE", filed on Apr. 27, 2021, both of above applications hereby incorporated by reference in their entireties.

TECHNICAL FIELD

The present application relates to the field of terminals and, in particular to a rhythm interaction method and device.

BACKGROUND

With the development of software development technologies, there are more and more types of application programs (Application, APP for short) on mobile terminals, where there is a type of APP related to music, through which users can enter a live broadcast room of a singer to listen to the singer's singing in the live broadcast room.

SUMMARY

The present application provides a rhythm interaction method and device to solve the problem of a single interaction mode in a live broadcast room.

In a first aspect, the present application provides a rhythm interaction method, applied to a first client, and the method includes: sending, by the first client, a song identification to a server so that the server obtains audio data and song rhythm point information according to the song identification, sends the audio data to the first client and at least one second client, and sends the song rhythm point information to at least one target client so that the target client obtains a score of the target client according to the song rhythm point information and sends the score of the target client to the server so that the server obtains a rhythm interaction result according to the score of the at least one target client and sends the rhythm interaction result to the first client and the at least one target client; where the at least one second client is a client that enters a live broadcast room of the first client, and the target client is a second client of the at least one second client that participates in rhythm interaction; playing, by the first client, a song according to the audio data sent by the server; and displaying, by the first client, the rhythm interaction result sent by the server, within a preset time period before an end of the playing of the song.

In a second aspect, the present application provides a rhythm interaction method, applied to a server, and the method includes: receiving, by the server, a song identification sent by a first client; obtaining, by the server, audio data and song rhythm point information according to the song identification; sending, by the server, the audio data to the first client and at least one second client, sending the song rhythm point information to at least one target client so that the target client obtains a score of the target client according to the song rhythm point information and sends the score of the target client to the server; where the at least one second client is a client that enters a live broadcast room of the first client, and the target client is a second client of the at least one second client that participates in rhythm interaction; obtaining, by the server, a rhythm interaction result according to the score of the at least one target client; and sending, by the server, the rhythm interaction result to the first client and the at least one target client.

In an implementation, the obtaining, by the server, the rhythm interaction result according to the score of the at least one target client includes: sorting, by the server, the score of the at least one target client from most to least; and taking avatars of users of top N scored target clients and an avatar of a user of the first client as the rhythm interaction result, where N is a positive integer greater than or equal to 1.

In a third aspect, the present application provides a rhythm interaction method, applied to a target client, where a user interface of the target client includes an operating area and the method includes: receiving, by the target client, audio data and song rhythm point information sent by a server, where the audio data and the song rhythm point information are obtained by the server after receiving a song identification sent by a first client; playing, by the target client, a song according to the audio data; generating, by the target client, a plurality of visualized rhythm objects according to the song rhythm point information, controlling the plurality of visualized rhythm objects to move toward the operating area, and determining a score of the target client according to at least one touch operation of a user on the operating area; sending, by the target client, the score of the target client to the server so that the server determines a rhythm interaction result according to the score of the target client; receiving, by the target client, the rhythm interaction result sent by the server; and displaying, by the target client, the rhythm interaction result.

In an implementation, the determining the score of the target client according to the at least one touch operation of the user on the operating area includes: obtaining a score of each touch operation; and performing addition on the score of each touch operation to obtain the score of the target client.

In an implementation, the operating area includes a first edge and a second edge, the first edge is an edge passed by the plurality of visualized rhythm objects, and the second edge is an edge opposite to the first edge; where the obtaining the score of each touch operation includes: if the user performs a touch operation on the operating area when the visualized rhythm object moves to a position that is outside the operating area and not in contact with the first edge, determining that the score of the touch operation is a first preset score;

- if the user performs a touch operation on the operating area when the visualized rhythm object moves to a position that is outside the operating area and in contact with the first edge, determining that the score of the touch operation is a second preset score;
- if the user performs a touch operation on the operating area when the visualized rhythm object moves to a position that is within the operating area and in contact with the first edge, determining that the score of the touch operation is a third preset score;
- if the user performs a touch operation on the operating area when the visualized rhythm object moves to a position that is within the operating area and not in contact with the first edge, determining that the score of the touch operation is the second preset score; or
- if the user performs a touch operation when the visualized rhythm object moves to a position intersecting with the second edge, determining that the score of the touch operation is the first preset score, where the first preset score is less than the second preset score, and the second preset score is less than the third preset score.

In an implementation, before determining the score of the target client according to the at least one touch operation of the user on the operating area, the method further includes: displaying a guiding gesture in the operating area, where the guiding gesture is used to instruct the user to perform a touch operation in the operating area.

In an implementation, the method further includes: displaying a progress bar in the operating area, where the progress bar is positively correlated with a current score of the target client.

In an implementation, the displaying, by the target client, the rhythm interaction result includes: displaying, by the target client, the rhythm interaction result within a preset time period before an end of the playing of the song.

In an implementation, the method further includes: setting a state of the progress bar to an initial state within a preset time period before an end of the playing of the song.

In a fourth aspect, the present application provides a first client, including: a sending module, configured to send a song identification to a server so that the server obtains audio data and song rhythm point information according to the song identification, sends the audio data to the first client and at least one second client, and sends the song rhythm point information to at least one target client so that the target client obtains a score of the target client according to the song rhythm point information and sends the score of the target client to the server so that the server obtains a rhythm interaction result according to the score of the at least one target client and sends the rhythm interaction result to the first client and the at least one target client; where the at least one second client is a client that enters a live broadcast room of the first client, and the target client is a second client of the at least one second client that participates in rhythm interaction; a playing module, configured to play a song according to the audio data sent by the server; and a display module, configured to display the rhythm interaction result sent by the server, within a preset time period before an end of the playing of the song.

In a fifth aspect, the present application provides a server, including: a receiving module, configured to receive a song identification sent by a first client; an obtaining module, configured to obtain audio data and song rhythm point information according to the song identification; and a sending module, configured to send the audio data to the first client and at least one second client, send the song rhythm point information to at least one target client so that the target client obtains a score of the target client according to the song rhythm point information and sends the score of the target client to the server; where the at least one second client is a client that enters a live broadcast room of the first client, and the target client is a second client of the at least one second client that participates in rhythm interaction; where the obtaining module is further configured to obtain a rhythm interaction result according to the score of the at least one target client; and the sending module is further configured to send the rhythm interaction result to the first client and the at least one target client.

In a sixth aspect, the present application provides a target client, including: a receiving module, configured to receive audio data and song rhythm point information sent by a server, where the audio data and the song rhythm point information are obtained by the server after receiving a song identification sent by a first client; a playing module, configured to play a song according to the audio data; a processing module, configured to generate a plurality of visualized rhythm objects according to the song rhythm point information, control the plurality of visualized rhythm objects to move toward the operating area, and determine a score of the target client according to at least one touch operation of a user on the operating area; a sending module, configured to send the score of the target client to the server so that the server determines a rhythm interaction result according to the score of the target client; where the receiving module is further configured to receive the rhythm interaction result sent by the server; and a display module, configured to display the rhythm interaction result.

In a seventh aspect, the present application provides a computer-readable storage medium, on which a computer program is stored, where the computer program, when executed by a processor, implements the method provided in the first aspect, the second aspect or the third aspect.

In an eighth aspect, the present application provides an electronic device, including: a processor; and a memory configured to store an executable instruction executed by the processor; where the processor is configured to execute the executable instructions to implement the method provided in the first aspect, the second aspect or the third aspect.

In a ninth aspect, the present application provides a computer program product, including a computer program which, when executed by a processor, implements the method provided in the first aspect, the second aspect, or the third aspect.

In a tenth aspect, the present application provides a computer program which, when executed by a processor, implements the method provided in the first aspect, the second aspect, or the third aspect.

DESCRIPTION OF EMBODIMENTS

In order to make the purpose, technical solutions and advantages of the present application clearer, the technical solutions of the present application will be clearly and completely described below in conjunction with the drawings of the present application. Obviously, the described embodiments are part of the embodiments of the present application, but not all of them. Based on the embodiments in the present application, all other embodiments obtained by persons of ordinary skill in the art without creative efforts shall fall within the protection scope of the present application.

In this application, it should be explained that the terms “first” and “second” are only used for descriptive purposes, but should not be understood as indicating or implying relative importance. In addition, “at least one” refers to one or more, and “a plurality of” refers to two or more. “And/or” describes an association relationship of the associated objects, which means that there can be three kinds of relationships, for example, A and/or B can mean: A exists alone, both A and B exist, and B exists alone, where A or B can be singular or plural. The character “/” generally indicates that the contextually associated objects are in an “or” relationship. “At least one of the following” or similar expressions thereto refer to any combination of these items, including any combination of single or plural items. For example, at least one of a, b or c may represent: a alone, b alone, c alone, a combination of a and b, a combination of a and c, a combination of b and c, or a combination of a, b and c, where a, b or c can be singular or plural.

In related technologies, after a user enters a live broadcast room of a certain singer, there are interaction modes between the user and the singer during the singer’s singing process, such as commenting, gift-giving and others. However, these interaction modes are relatively undiversified and the user experience is not strong.

Figure 1:
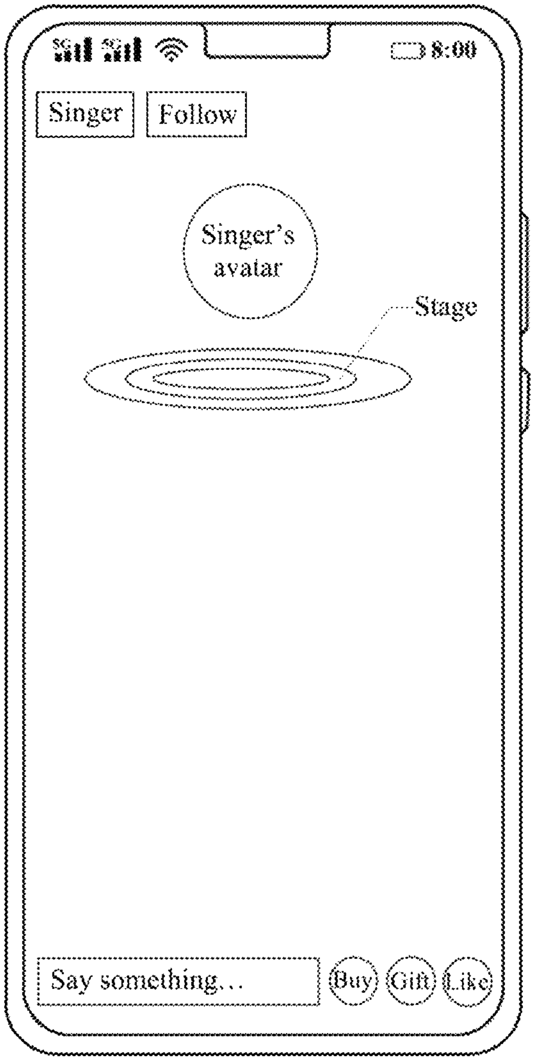
FIG. 1 is an application scenario diagram provided according to the present application.

FIG. 1 is an application scenario diagram provided according to the present application. The present application involves a scenario where a viewer interacts with a singer when the singer performs singing through live-streaming. Illustratively, FIG. 1 shows a schematic diagram of a live broadcast room of a singer. When viewers want to interact with the singer, they can input comments, give gifts to the singer or give likes to the singer, and so on through the user interface shown in FIG. 1. However, these interaction modes are not much different from other live-streaming scenarios. Currently, the APPs used for singing songs through live-streaming lack interaction modes that are more suitable for singing scenarios, resulting in poor user experience.

From the observation of real singing scenarios such as vocal concerts, concerts, or music festivals, it is found that the common interaction between the viewers and the singer is to beat time following the rhythm. Inspired by this phenomenon, the present application provides a rhythm interaction method for a live broadcast room, where a viewer can beat time in conjunction with the rhythm of the song that the singer is singing, the better the beating, the higher the score, and if the score of the viewer is high enough, the viewer’s avatar can be displayed on the user interface at the same time with the singer’s avatar when the playing of the song is almost finished, thereby enhancing the user interaction experience.

The system framework involved in realizing the interaction method of the present application is introduced below.

Figure 2:
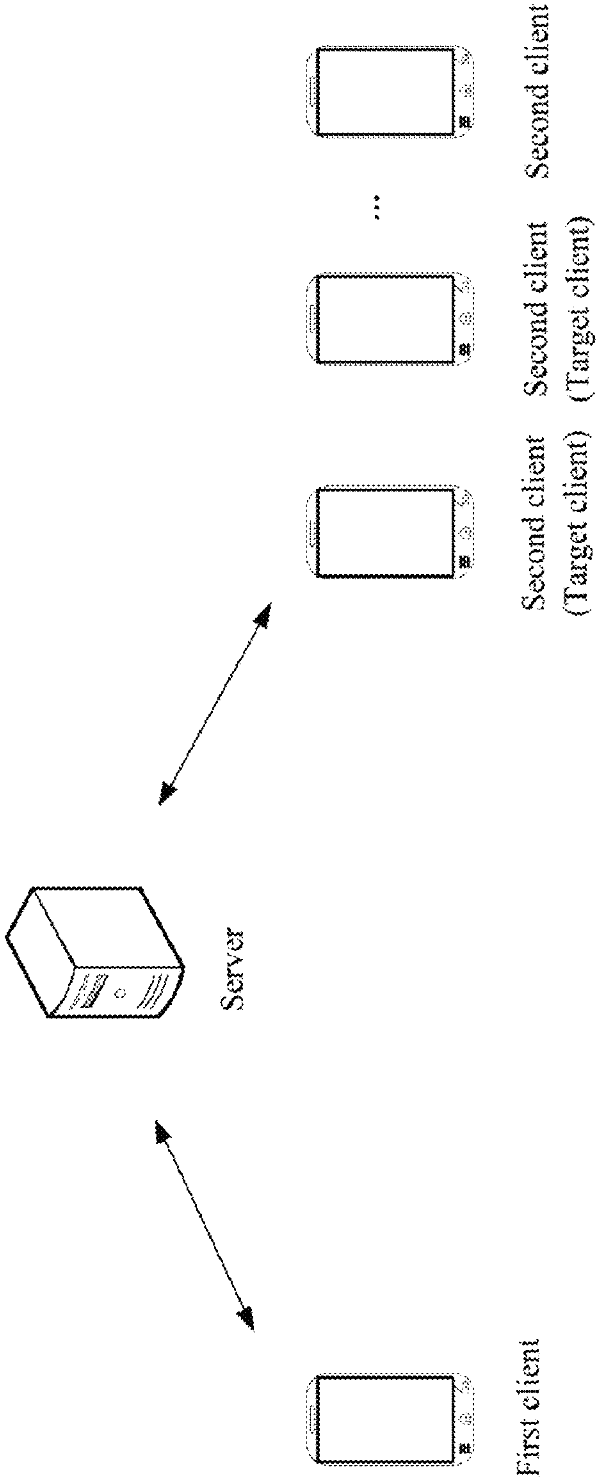
FIG. 2 is a system framework diagram provided according to the present application.

FIG. 2 is a system framework diagram provided according to the present application. The system shown in FIG. 2 includes: a first client corresponding to a singer, a server and at least one second client. The client in the present application can be understood as an APP, or an electronic device such as a mobile phone, a tablet computer, or a notebook computer.

During live broadcasting by the singer through the first client, any client can enter the live broadcast room of the first client, and the server maintains the information of the clients entering the live broadcast room of the first client. A client that enters the live broadcast room of the first client is called a second client in the present application.

It should be noted that: in the rhythm interaction method provided according to the present application, after the second client enters the live broadcast room of the first client, the viewer can choose to participate in the rhythm interaction or choose not to participate in the rhythm interaction. When the viewer chooses to participate in the rhythm interaction, the second client can send a request for participating in the rhythm interaction to the server. After receiving the request, the server can determine that the second client is a target client, and the server will subsequently summarize the rhythm interaction scores of all target clients, and determine a winner based on the summarized results, and notify the winner information to all target clients.

It should be noted that after the second client enters the live broadcast room of the first client, the viewer can choose to participate in the rhythm interaction at any time. Therefore, during live broadcasting by the singer through the first client, the number of target clients may change.

The interaction process among the first client, the server, and the target client will be described in detail below in conjunction with specific embodiments.

Embodiment 1

Figure 3:
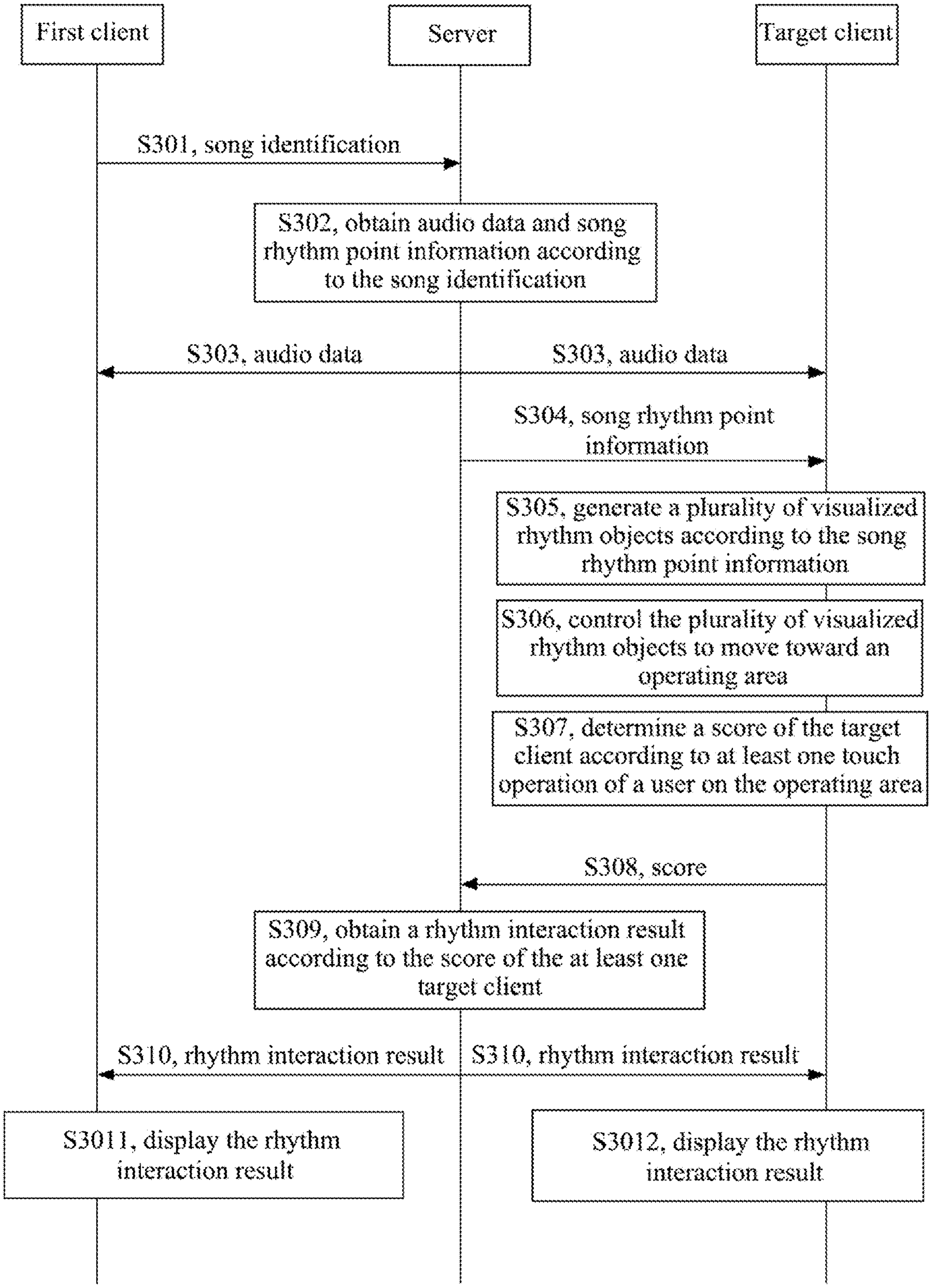
FIG. 3 is a schematic flowchart of Embodiment 1 of a rhythm interaction method provided according to the present application.

FIG. 3 is a schematic flowchart of Embodiment 1 of a rhythm interaction method provided according to the present application. As shown in FIG. 3, the rhythm interaction method provided according to this embodiment includes:

S301, a first client sends a song identification to a server.

In a possible implementation, a user interface of the first client may allow a singer to select a song, and after the singer selects a certain song, the first client may send the song identification of the song to the server.

S302, the server obtains audio data and song rhythm point information according to the song identification.

In a possible implementation, the server stores therein audio data and song rhythm point information of many songs. After receiving the song identification, the server searches for audio data corresponding to the song identification from the stored audio data, and searches for song rhythm point information corresponding to the song identification from the stored song rhythm point information.

Figure 4:
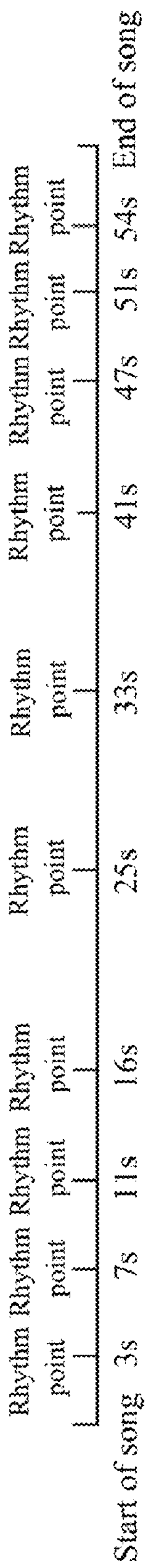
FIG. 4 is a schematic diagram of song rhythm point information provided according to the present application.

In a possible implementation, the song rhythm point information is a correspondence between time points and rhythm points. Illustratively, FIG. 4 shows song rhythm point information of a song. Referring to FIG. 4, each of the 3rd, 7th, 11th, 16th, 25th, 33rd, 41st, 47th, 51st, and 54th seconds after the start of the song corresponds to a rhythm point.

S303, the server sends the audio data to the first client and at least one target client.

After receiving the audio data, the first client and the at least one target client both play the song according to the audio data.

It should be noted that: the server can send the audio data to the first client and at least one second client, so that all clients entering the live broadcast room of the first client can play the song regardless of whether they participate in the rhythm interaction.

S304, the server sends the song rhythm point information to at least one target client.

Although there is at least one second client entering the live broadcast room of the first client, not all viewers will choose to participate in the rhythm interaction. Therefore, the server may only send the song rhythm point information to at least one target client.

The server may send both the audio data and the song rhythm point information to the target client at the same time.

It should be noted that: as described above, after the second client enters the live broadcast room of the first client, the viewer can choose to participate in the rhythm interaction at any time, and if the server has already sent the song rhythm point information when the viewer chooses to participate in the rhythm interaction, then the server may send the song rhythm point information again to this client.

S305, the target client generates a plurality of visualized rhythm objects according to the song rhythm point information.

In a possible implementation, the visualized rhythm object may be a point, line, or surface of any shape, such as a straight line, a curved line, a pyramid, or a cube. A visualized rhythm object is generated for each rhythm point of the song rhythm point information. The plurality of visualized rhythm objects may have the same color or have different colors. Since each rhythm point corresponds to a time point, each visualized rhythm object also corresponds to a time point.

Figure 5:
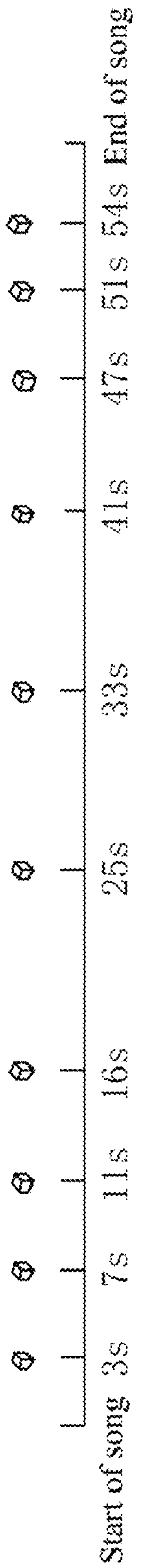
FIG. 5 is a schematic diagram of a plurality of visualized rhythm objects provided according to the present application.

Illustratively, corresponding to the song rhythm point information shown in FIG. 4, FIG. 5 shows the correspondence between the plurality of visualized rhythm objects and time points.

S306, the target client controls the plurality of visualized rhythm objects to move toward an operating area.

Figure 6:
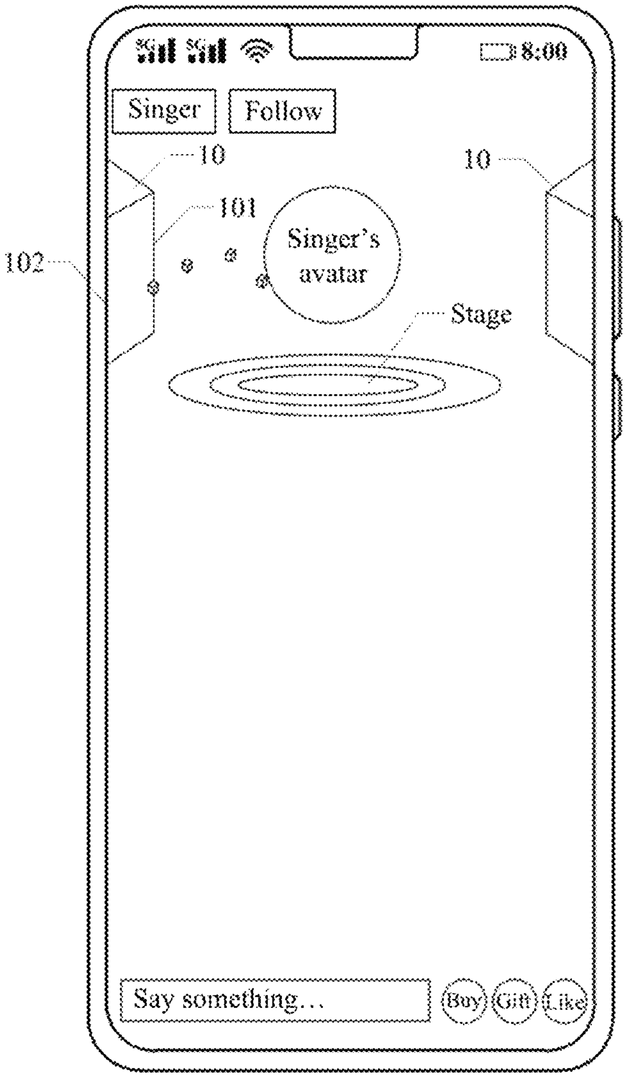
FIG. 6 is a schematic diagram of an operating area provided according to the present application.

In a possible implementation, as shown in FIG. 6, for the convenience of description, in the operating area 10 provided in the live broadcast room of the first client, the right edge 101 of the operating area 10 is called a first edge, and the left edge 102 of the operating area is called a second edge. The plurality of visualized rhythm objects can be controlled to move from the avatar of the singer toward the operating area one after another.

In a possible implementation, the plurality of visualized rhythm objects can pass the first edge 101 to move into the operating area. The respective visualized rhythm objects may have the same movement path or have different movement paths, which is not limited in the present application.

In a possible implementation, since each visualized rhythm object corresponds to a time point, the visualized rhythm object can be controlled to just move into the operating area at a corresponding time point.

Take the plurality of visualized rhythm objects illustrated by FIG. 5 as an example: at the 3rd second after the start of the song, control the first visualized rhythm object in FIG. 5 to just move into the operating area; at the 7th second after the start of the song, control the second visualized rhythm object in FIG. 5 to just move into the operating area; at the 11th second after the start of the song, control the third visualized rhythm object in FIG. 5 to just move into the operating area; at the 16th second after the start of the song, control the fourth visualized rhythm object in FIG. 5 to just move into the operating area; at the 25th second after the start of the song, control the fifth visualized rhythm object in FIG. 5 to just move into the operating area; at the 33rd second after the start of the song, control the sixth visualized rhythm object in FIG. 5 to just move into the operating area; at the 41st second after the start of the song, control the seventh visualized rhythm object in FIG. 5 to just move into the operating area; at the 47th second after the start of the song, control the eighth visualized rhythm object in FIG. 5 to just move into the operating area; at the 51st second after the start of the song, control the ninth visualized rhythm object in FIG. 5 to just move into the operating area; and at the 54th second after the start of the song, control the tenth visualized rhythm object in FIG. 5 to just move into the operating area.

The above-mentioned just moving into the operating area refers to moving to a position that is within the operating area and in contact with the first edge.

S307, the target client determines a score of the target client according to at least one touch operation of a user on the operating area.

Specifically, the user's touch operation on the operating area may be a click operation. During the process where the plurality of visualized rhythm objects are moved from the singer's avatar toward the operating area one after another, the user's beating time can be realized by clicking on the operating area. The more accurate the timing of the click, the higher the score of this click.

In a possible implementation, three scoring levels are set in the present application, namely a perfect level, a good level and a miss level respectively. A respective one of the three levels corresponds to a preset score, the preset score corresponding to the perfect level is the highest, the preset score corresponding to the good level is next, and the preset score corresponding to the miss level is the lowest. When the user's click operation belongs to the perfect level, the word perfect may be displayed on the user interface; correspondingly, when the user's click operation belongs to the good level, the word good may be displayed on the user interface; when the user's click operation belongs to the miss level, the word miss may be displayed on the user interface; so that the user can perceive the accuracy of the click operation.

Figure 7:
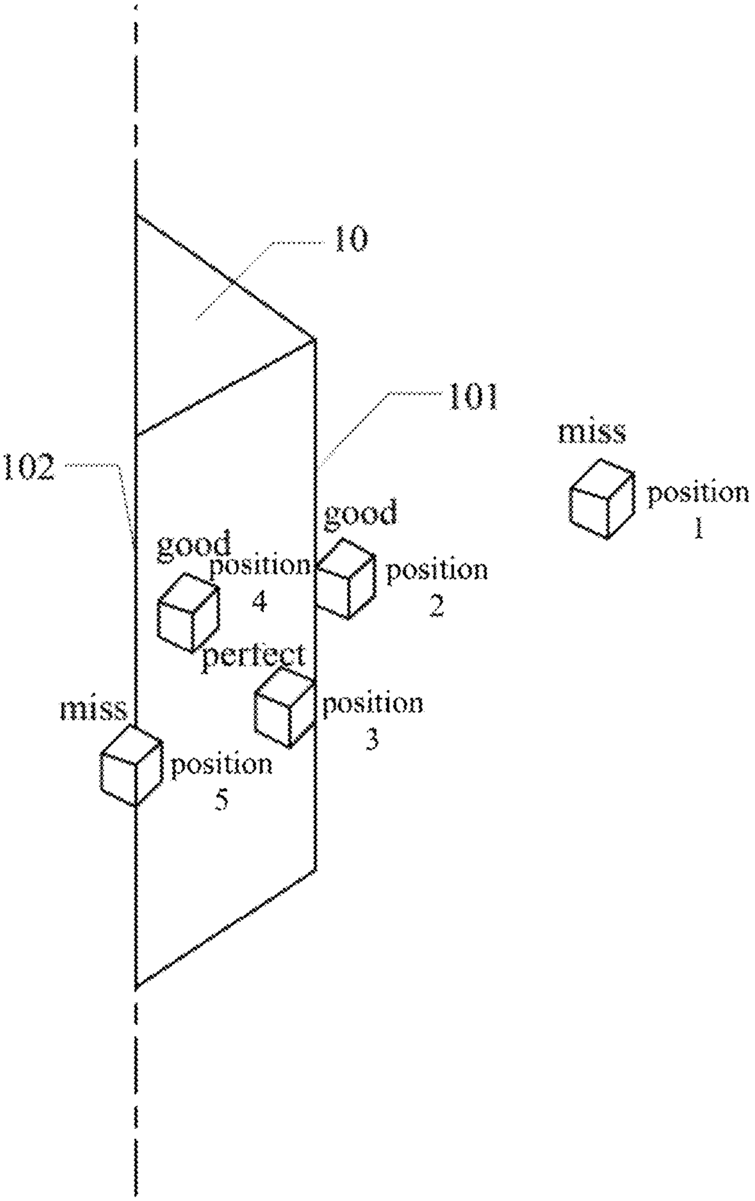
FIG. 7 is a schematic diagram of a score of a touch operation provided according to the present application.

In a possible implementation, if the user performs a touch operation on the operating area when the visualized rhythm object moves to a position that is outside the operating area and not in contact with the first edge, it is determined that the level of the touch operation is "miss", and the score of the touch operation is a first preset score. FIG. 7 shows an example of a position that is outside the operating area and not in contact with the first edge, denoted by position 1 in FIG. 7.

If the user performs a touch operation on the operating area when the visualized rhythm object moves to a position that is outside the operating area and in contact with the first edge, the level of the touch operation is determined to be "good", and the score of the touch operation is a second preset score. FIG. 7 shows an example of a position that is outside the operating area and in contact with the first edge, denoted by position 2 in FIG. 7.

If the user performs a touch operation on the operating area when the visualized rhythm object moves to a position that is within the operating area and in contact with the first edge, then the level of the touch operation is determined to be "perfect", and the score of the touch operation is a third preset score. FIG. 7 shows an example of a position that is within the operating area and in contact with the first edge, denoted by position 3 in FIG. 7.

If the user performs a touch operation on the operating area when the visualized rhythm object moves to a position that is within the operating area and not in contact with the first edge, the level of the touch operation is determined to be "good", and the score of the touch operation is the second preset score. FIG. 7 shows an example of a position that is within the operating area and not in contact with the first edge, denoted by position 4 in FIG. 7.

If the user performs a touch operation on the operating area when the visualized rhythm object moves to a position intersecting with the second edge, the level of the touch operation is determined to be "miss", and the score of the touch operation is the first preset score. FIG. 7 shows an example of a position intersecting with the second edge, denoted by position 5 in FIG. 7.

After obtaining the score of each touch operation of the user, addition can be performed on the score of each touch operation to obtain the score of the target client.

S308, the target client sends the score of the target client to the server.

S309, the server obtains a rhythm interaction result according to the score of the at least one target client.

In a possible implementation, the server sorts the scores of the at least one target client from most to least and takes avatars of users of top N scored target clients and an avatar of a user of the first client as the rhythm interaction result.

For example:

scores of at least one target client are sorted from most to least, assuming that the users of the top two ranked target clients are viewer A and viewer B, then the avatar of viewer A, the avatar of viewer B and the avatar of the singer are taken as the rhythm interaction result.

S3010, the server sends the rhythm interaction result to the first client and the at least one target client.

S3011, the first client displays the rhythm interaction result.

S3012, the target client displays the rhythm interaction result.

In a possible implementation, the target client may display the rhythm interaction result within a preset time period before the end of the playing of the song. For example, the rhythm interaction result is displayed within 5 seconds before the end of the playing of the song.

Figure 8:
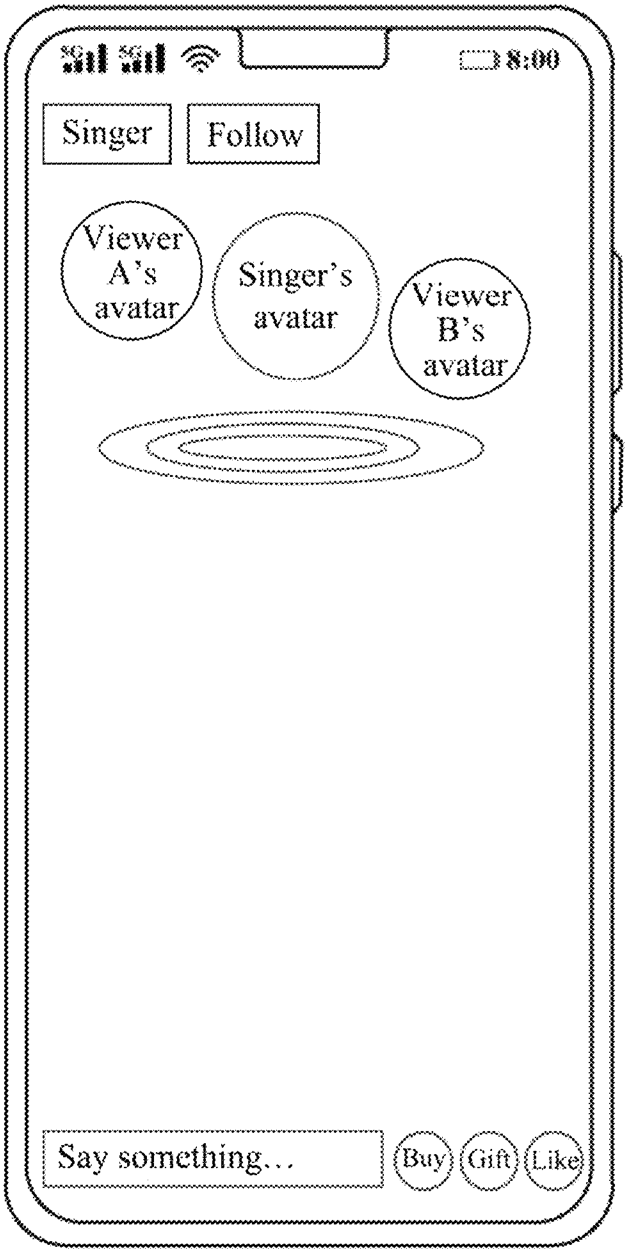
FIG. 8 is a schematic diagram of a rhythm interaction result provided according to the present application.

For example:

assuming that the users of the top two ranked target clients are viewer A and viewer B, the rhythm interaction result will be the avatar of viewer A, the avatar of viewer B and the avatar of the singer; referring to FIG. 8, the avatar of viewer A, the avatar of viewer B and the avatar of the singer can be displayed on the user interface at the same time.

Figure 9:
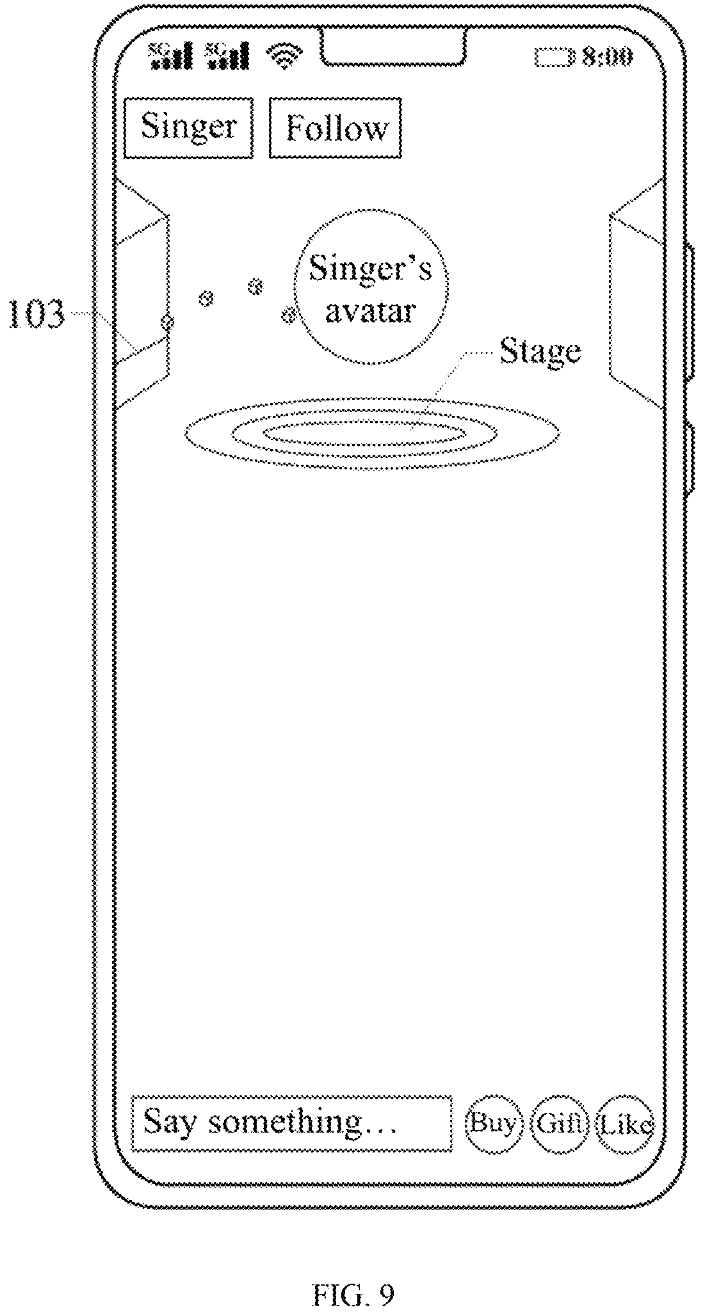
FIG. 9 is a schematic diagram of a progress bar provided according to the present application.

In order to display the level of the current score of the target client in real-time, as shown in FIG. 9, a progress bar 103 may be displayed in the operating area, and the progress bar is positively correlated with the current score of the target client. As the score increases, the progress bar goes up. The target client may set the state of the progress bar to an initial state within a preset time period before the end of the playing of the song, for example, the state of the progress bar may be set to the initial state while the rhythm interaction result is displayed.

Figure 10:
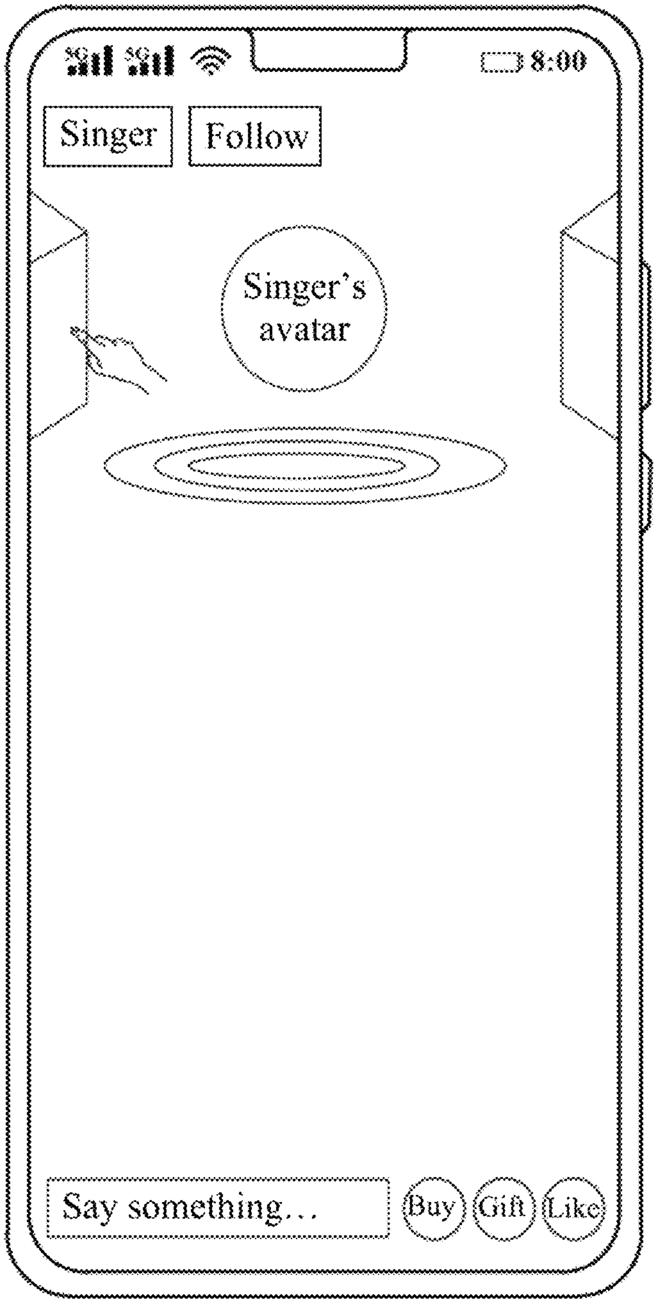
FIG. 10 is a schematic diagram of a guiding gesture provided according to the present application.

After the second client enters the live broadcast room of the first client, in order to remind the user where the operating area is, as shown in FIG. 10, a guiding gesture may be displayed in the operating area, and the user may learn from the guiding gesture that the touch operation is to be performed in the area corresponding to the guiding gesture.

In a possible implementation, if the user performs a touch operation on the operating area according to the guiding gesture, the second client may determine that the user chooses to participate in rhythm interaction, and then the second client may send a request for participating in rhythm interaction to the server so that the server receives the request and sets the second client as the target client.

According to the rhythm interaction method provided in this embodiment, a viewer may beat time in conjunction with the rhythm of the song that the singer is singing, the better the beating, the higher the score, and when the playing of the song is almost finished, the avatar of the viewer and the avatar of the singer may be displayed on the user interface at the same time if the score of the viewer is high enough, thereby improving the user interaction experience.

Figure 11:
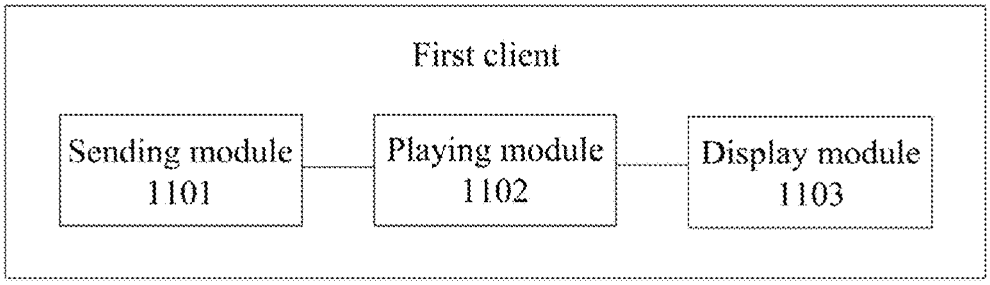
FIG. 11 is a schematic structural diagram of a first client provided according to the present application.

FIG. 11 is a schematic structural diagram of a first client provided according to the present application. As shown in FIG. 11, the first client provided according to the present application includes:

a sending module 1101, configured to send a song identification to a server so that the server obtains audio data and song rhythm point information according to the song identification, sends the audio data to the first client and at least one second client, and sends the song rhythm point information to at least one target client so that the target client obtains a score of the target client according to the song rhythm point information and sends the score of the target client to the server so that the server obtains a rhythm interaction result according to the score of the at least one target client and sends the rhythm interaction result to the first client and the at least one target client; where the at least one second client is a client that enters a live broadcast room of the first client, and the target client is a second client of the at least one second client that participates in rhythm interaction;

a playing module 1102, configured to play a song according to the audio data sent by the server;

a display module 1103, configured to display the rhythm interaction result sent by the server, within a preset time period before an end of the playing of the song.

The first client provided according to the present application can be configured to perform the steps performed by the first client in any of the method embodiments mentioned above, and is implemented using similar principles and produces the similar technical effect, which will not be repeated here.

Figure 12:
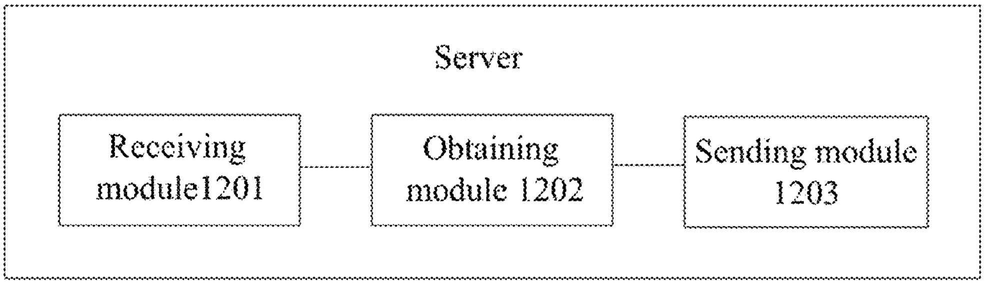
FIG. 12 is a schematic structural diagram of a server provided according to the present application.

FIG. 12 is a schematic structural diagram of a server provided according to the present application. As shown in FIG. 12, the server provided according to the present application includes: a receiving module 1201, configured to receive a song identification sent by a first client;

an obtaining module 1202, configured to obtain audio data and song rhythm point information according to the song identification;

a sending module 1203, configured to send the audio data to the first client and at least one second client, send the song rhythm point information to at least one target client so that the target client obtains a score of the target client according to the song rhythm point information and sends the score of the target client to the server; where the at least one second client is a client that enters a live broadcast room of the first client, and the target client is a second client of the at least one second client that participates in rhythm interaction;

where the obtaining module 1202 is further configured to obtain a rhythm interaction result according to the score of the at least one target client;

where the sending module 1203 is further configured to send the rhythm interaction result to the first client and the at least one target client.

The obtaining module 1202 is specifically configured to:

sort the score of the at least one target client from most to least;

take avatars of users of top N scored target clients and an avatar of a user of the first client as the rhythm interaction result.

The server provided according to the present application can be configured to perform the steps performed by the server in any of the method embodiments mentioned above, and is implemented using the similar principles and produces the similar technical effect, which will not be repeated here.

Figure 13:
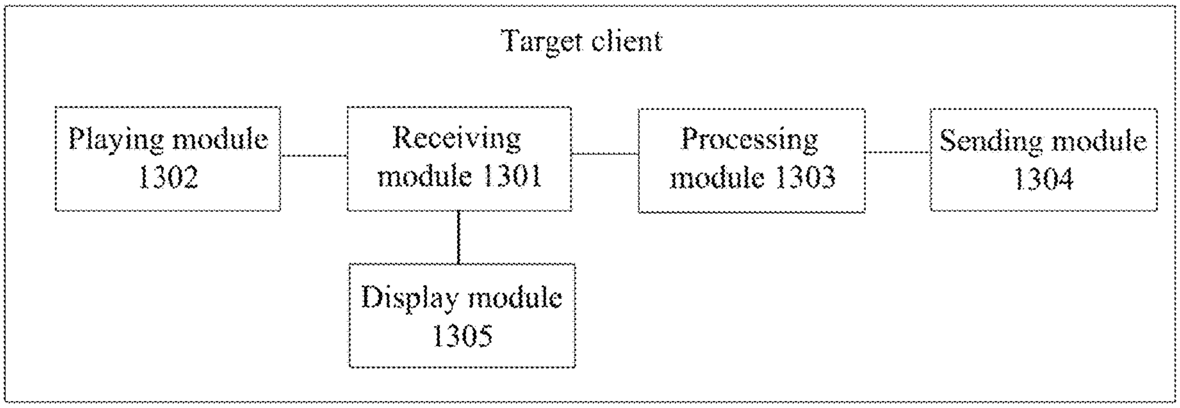
FIG. 13 is a schematic structural diagram of a target client provided according to the present application.

FIG. 13 is a schematic structural diagram of a target client provided according to the present application. As shown in FIG. 13, the target client provided according to the present application includes:

a receiving module 1301, configured to receive audio data and song rhythm point information sent by a server, where the audio data and the song rhythm point information are obtained by the server after receiving a song identification sent by a first client;

a playing module 1302, configured to play a song according to the audio data;

a processing module 1303, configured to generate a plurality of visualized rhythm objects according to the song rhythm point information, control the plurality of visualized rhythm objects to move toward the operating area, and determine a score of the target client according to at least one touch operation of a user on the operating area;

a sending module 1304, configured to send the score of the target client to the server so that the server determines a rhythm interaction result according to the score of the target client;

where the receiving module 1301 is further configured to receive the rhythm interaction result sent by the server; and a display module 1305, configured to display the rhythm interaction result.

In an implementation, the processing module 1303 is specifically configured to:

obtain a score of each touch operation;

perform addition on the score of each touch operation to obtain the score of the target client.

In an implementation, the processing module 1303 is specifically configured to:

if the user performs a touch operation on the operating area when the visualized rhythm object moves to a position that is outside the operating area and not in contact with the first edge, determine that the score of the touch operation is a first preset score;

if the user performs a touch operation on the operating area when the visualized rhythm object moves to a position that is outside the operating area and in contact with the first edge, determine that the score of the touch operation is a second preset score;

if the user performs a touch operation on the operating area when the visualized rhythm object moves to a position that is within the operating area and in contact with the first edge, determine that the score of the touch operation is a third preset score;

if the user performs a touch operation on the operating area when the visualized rhythm object moves to a position that is within the operating area and not in contact with the first edge, determine that the score of the touch operation is the second preset score; or if the user performs a touch operation when the visualized rhythm object moves to a position intersecting with the second edge, determine that the score of the touch operation is the first preset score, where the first preset score is less than the second preset score, and the second preset score is less than the third preset score.

In an implementation, the display module 1305 is further configured to:

display a guiding gesture in the operating area, where the guiding gesture is used to instruct the user to perform a touch operation in the operating area.

In an implementation, the display module 1305 is further configured to:

display a progress bar in the operating area, where the progress bar is positively correlated with a current score of the target client.

In an implementation, the display module 1305 is specifically configured to:

display the rhythm interaction result within a preset time period before an end of the playing of the song.

In an implementation, the processing module 1303 is further configured to:

set a state of the progress bar to an initial state within a preset time period before an end of the playing of the song.

The target client provided according to the present application can be configured to perform the steps performed by the target client in any of the method embodiments mentioned above, and is implemented using the similar principle and produces the similar technical effect, which will not be repeated here.

Figure 14:
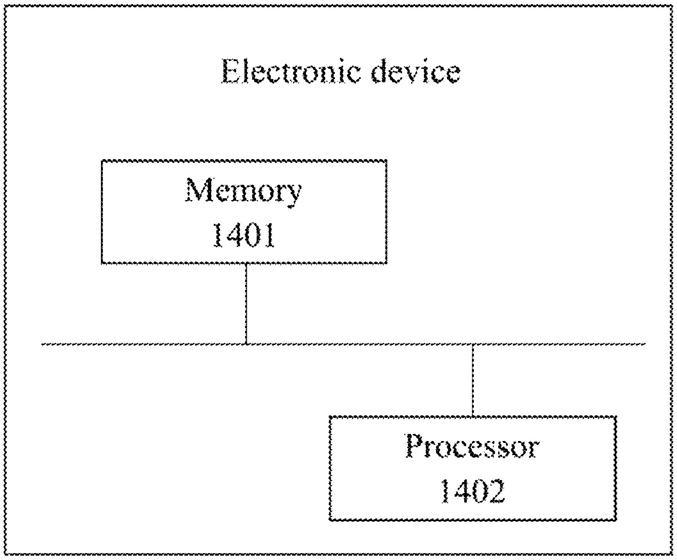
FIG. 14 is a schematic diagram of a hardware structure of an electronic device provided according to the present application.

FIG. 14 is a schematic diagram of a hardware structure of an electronic device provided according to the present application. As shown in FIG. 14, the electronic device according to this embodiment includes:

a memory 1401, configured to store a program instruction;

a processor 1402, configured to implement the steps performed by the first client, the target client, or the server in any of the embodiments mentioned above when the program instruction is executed, and for specific implementation principles thereof, reference can be made to the above-mentioned embodiments, which will not be repeated herein in this embodiment.

The present application provides a computer-readable storage medium, on which a computer program is stored, where the computer program, when executed by a processor, implements the steps performed by the first client, the target client or the server in any of the embodiments mentioned above.

The present application provides a computer program product, which includes a computer program; where the computer program is stored in a readable storage medium from which at least one processor can read the computer program, and the at least one processor executes the computer program to enable a chip to implement the steps performed by the first client, the target client or the server in any of the embodiments mentioned above.

The present application further provides a computer program, and when the computer program is executed by a processor, the steps performed by the first client, the target client, or the server in any of the embodiments mentioned above are implemented.

Through the rhythm interaction method and device provided according to the present application, a viewer may beat time in conjunction with the rhythm of the song that the singer is singing, the better the beating, the higher the score, and when the playing of the song is almost finished, the avatar of the viewer and the avatar of the singer may be displayed on the user interface at the same time if the score of the viewer is high enough, thereby improving the user interaction experience.

In the several embodiments provided in the present application, it should be understood that the disclosed devices and methods may be implemented in other ways. For example, the device embodiments described above are only illustrative. For example, the division of the modules is only a logical function division, and there may be other division modes in a practical implementation. For example, a plurality of modules or components may be combined or integrated into another system, or some features may be ignored, or not implemented. Another point is that, the mutual coupling or direct coupling or communication connection shown or discussed may be through some interfaces, and the indirect coupling or communication connection of devices or modules may be in electrical, mechanical or other forms.

The modules described as separate components may or may not be physically separated, and the components displayed as modules may or may not be physical modules, that is, they may be located in one place, or distributed to a plurality of network units. Part or all of the modules may be selected according to actual needs to achieve the purpose of the solution of the embodiments.

In addition, respective functional modules in respective embodiments of the present application may be integrated into a processing module, or they may exist separately physically, or two or more modules may be integrated into a module. The above-mentioned integrated modules may be implemented in the form of hardware, or in the form of hardware plus a software function module.

The above-mentioned integrated module implemented in the form of software function modules may be stored in a computer-readable storage medium. The above-mentioned software functional modules are stored in a storage medium, including several instructions to enable a computer device (which may be a personal computer, a server, or a network device, etc.) or processor to execute some steps of the methods described in the various embodiments of the present application. The storage medium mentioned above includes various media in which program codes may be stored, such as a U disk, a mobile hard disk, a read-only memory (ROM for short), random access memory (RAM for short), a magnetic disk or an optical disc.

It should be understood that the processor described in the present application may be a central processing unit (CPU for short), or may also be another general-purpose processor, a digital signal processor (DSP for short), an application specific integrated circuit (ASIC for short), etc. A general-purpose processor may be a microprocessor, any conventional processor, or the like. The steps of the methods disclosed in combination with the present application may be directly reflected as the completion of execution by a hardware processor or the completion of execution by a combination of hardware and software modules in the processor.

Finally, it should be noted that the embodiments mentioned above are only intended to illustrate the technical solutions of the present application, but are not limited thereto. Although the present application is described in detail with reference to the foregoing embodiments, those of ordinary skill in the art should understand that it is still possible to modify the technical solutions described in the foregoing embodiments, or perform equivalent replacements for some or all of the technical features thereof, but these modifications or replacements do not make the essence of the corresponding technical solutions deviate from the scope of technical solutions of the embodiments of the present application.

The invention claimed is:

1. A rhythm interaction method, applied to a first client, the method comprising:

sending, by the first client, a song identification to a server to enable the server to obtain audio data and song rhythm point information according to the song identification, wherein the audio data is sent from the server to the first client and at least one second client, and wherein the song rhythm point information is sent from the server to at least one third client, and used by the at least one third client to obtain a score of the at least one third client, wherein the score of the at least one third client is sent from the at least one third client to the server and used by the server to obtain a rhythm interaction result, and wherein the rhythm interaction result is sent from the server to the first client and the at least one third client; wherein the at least one second client is a client that enters a live stream of the first client, and the at least one third client is a second client of the at least one second client that participates in rhythm interaction;

wherein a score of each third client is obtained by performing addition on a score of each touch operation of a user on an operating area comprised in a user interface of the third client, the operating area comprises a first edge and a second edge, the first edge is an edge passed by a plurality of visualized rhythm objects, and the second edge is an edge opposite to the first edge; the score of the touch operation is determined as a first preset score if the user performs a touch operation on the operating area when a visualized rhythm object moves to a position that is outside the operating area and not in contact with the first edge, the score of the touch operation is determined as a second preset score if the user performs a touch operation on the operating area when the visualized rhythm object moves to a position that is outside the operating area and in contact with the first edge, the score of the touch operation is determined as a third preset score if the user performs a touch operation on the operating area when the visualized rhythm object moves to a position that is within the operating area and in contact with the first edge, the score of the touch operation is determined as the second preset score if the user performs a touch operation on the operating area when the visualized rhythm object moves to a position that is within the operating area and not in contact with the first edge, the score of the touch operation is determined as the first preset score if the user performs a touch operation when the visualized rhythm object moves to a position intersecting with the second edge, wherein the first preset score is less than the second preset score, and the second preset score is less than the third preset score;

playing, by the first client, a song according to the audio data sent by the server; and displaying, by the first client, the rhythm interaction result sent by the server, within a preset time period before an end of the playing of the song.

2. A rhythm interaction method, applied to a server, the method comprising:

receiving, by the server, a song identification sent by a first client;

obtaining, by the server, audio data and song rhythm point information according to the song identification;

sending, by the server, the audio data to the first client and at least one second client, sending the song rhythm point information to at least one third client so that the at least one third client obtains a score of the at least one third client according to the song rhythm point information and sends the score of the at least one third client to the server; wherein the at least one second client is a client that enters a live stream of the first client, and the at least one third client is a second client of the at least one second client that participates in rhythm interaction;

wherein a score of each third client is obtained by performing addition on a score of each touch operation of a user on an operating area comprised in a user interface of the third client, the operating area comprises a first edge and a second edge, the first edge is an edge passed by a plurality of visualized rhythm objects, and the second edge is an edge opposite to the first edge; the score of the touch operation is determined as a first preset score if the user performs a touch operation on the operating area when a visualized rhythm object moves to a position that is outside the operating area and not in contact with the first edge, the score of the touch operation is determined as a second preset score if the user performs a touch operation on the operating area when the visualized rhythm object moves to a position that is outside the operating area and in contact with the first edge, the score of the touch operation is determined as a third preset score if the user performs a touch operation on the operating area when the visualized rhythm object moves to a position that is within the operating area and in contact with the first edge, the score of the touch operation is determined as the second preset score if the user performs a touch operation on the operating area when the visualized rhythm object moves to a position that is within the operating area and not in contact with the first edge, the score of the touch operation is determined as the first preset score if the user performs a touch operation when the visualized rhythm object moves to a position intersecting with the second edge, wherein the first preset score is less than the second preset score, and the second preset score is less than the third preset score;

obtaining, by the server, a rhythm interaction result according to the score of the at least one third client; and sending, by the server, the rhythm interaction result to the first client and the at least one third client.

3. The method according to claim 2, wherein the obtaining, by the server, the rhythm interaction result according to the score of the at least one third client comprises:

sorting, by the server, the score of the at least one third client from most to least; and taking, by the server, avatars of users of top N scored third clients and an avatar of a user of the first client as the rhythm interaction result, wherein N is a positive integer greater than or equal to 1.

4. A rhythm interaction method, applied to a third client, wherein a user interface of the third client comprises an operating area, and the method comprises:

receiving, by the third client, audio data and song rhythm point information sent by a server, wherein the third client is a second client of at least one second client that participates in rhythm interaction, and the at least one second client is a client that enters a live stream of a first client;

playing, by the third client, a song according to the audio data;

generating, by the third client, a plurality of visualized rhythm objects according to the song rhythm point information, controlling the plurality of visualized rhythm objects to move toward the operating area, and determining a score of the third client according to at least one touch operation of a user on the operating area;

sending, by the third client, the score of the third client to the server so that the server determines a rhythm interaction result according to the score of the third client;

receiving, by the third client, the rhythm interaction result sent by the server; and displaying, by the third client, the rhythm interaction result;

wherein the determining the score of the third client according to the at least one touch operation of the user on the operating area comprises:

obtaining, by the third client, a score of each touch operation; and performing, by the third client, addition on the score of each touch operation to obtain the score of the third client;

wherein the operating area comprises a first edge and a second edge, the first edge is an edge passed by the plurality of visualized rhythm objects, and the second edge is an edge opposite to the first edge; wherein the obtaining the score of each touch operation comprises:

if the user performs a touch operation on the operating area when a visualized rhythm object moves to a position that is outside the operating area and not in contact with the first edge, determining, by the third client, that the score of the touch operation is a first preset score;

if the user performs a touch operation on the operating area when the visualized rhythm object moves to a position that is outside the operating area and in contact with the first edge, determining, by the third client, that the score of the touch operation is a second preset score;

if the user performs a touch operation on the operating area when the visualized rhythm object moves to a position that is within the operating area and in contact with the first edge, determining, by the third client, that the score of the touch operation is a third preset score;

if the user performs a touch operation on the operating area when the visualized rhythm object moves to a position that is within the operating area and not in contact with the first edge, determining, by the third client, that the score of the touch operation is the second preset score; or if the user performs a touch operation when the visualized rhythm object moves to a position intersecting with the second edge, determining, by the third client. that the score of the touch operation is the first preset score, wherein the first preset score is less than the second preset score, and the second preset score is less than the third preset score.

5. The method according to claim 4, before determining the score of the third client according to the at least one touch operation of the user on the operating area, further comprising:

displaying, by the third client, a guiding gesture in the operating area, wherein the guiding gesture is used to instruct the user to perform a touch operation in the operating area.

6. The method according to claim 5, further comprising:

displaying, by the third client, a progress bar in the operating area, wherein the progress bar is positively correlated with a current score of the third client.

7. The method according to claim 5, wherein the displaying, by the third client, the rhythm interaction result comprises:

displaying, by the third client, the rhythm interaction result within a preset time period before an end of the playing of the song.

8. The method according to claim 6, further comprising:

setting, by the third client, a state of the progress bar to an initial state within a preset time period before an end of the playing of the song.

9. A first client, comprising:

a processor; and memory, configured to store an executable instruction executed by the processor;

wherein the processor is configured to execute the executable instruction to implement the method according to claim 1.

10. A server, comprising:

a processor; and memory, configured to store an executable instruction executed by the processor;

wherein the processor is configured to execute the executable instruction to implement the method according to claim 2.

11. A third client, comprising:

a processor, and memory, configured to store an executable instruction executed by the processor;

wherein the processor is configured to execute the executable instruction to implement the method according to claim 4.

12. The server according to claim 10, wherein the processor is further configured to execute the executable instruction to:

sort the score of the at least one third client from most to least, and take avatars of users of top N scored third clients and an avatar of a user of the first client as the rhythm interaction result.

13. The third client according to claim 11, wherein the processor is further configured to execute the executable instruction to:

display a guiding gesture in the operating area, wherein the guiding gesture is used to instruct the user to perform a touch operation in the operating area.

14. The third client according to claim 13, wherein the processor is further configured to execute the executable instruction to:

display a progress bar in the operating area, wherein the progress bar is positively correlated with a current score of the third client.

15. The method according to claim 1, wherein the rhythm interaction result comprises an avatar of a user of the first client, and avatars of users of the at least one third client determined based on the score of the at least one third client.

16. The method according to claim 4, wherein the rhythm interaction result comprises an avatar of a user of the first client, and avatars of users of the third client determined based on the score of the third client.

* * * * *